3,533,989
PHOSPHITE ANTIOXIDANTS IN POLYOLEFINS
Lyle D. Wescott, Jr., Memphis, Tenn., assignor to Esso Research and Engineering Company
No Drawing. Original application Mar. 15, 1967, Ser. No. 623,204, now Patent No. 3,489,826, dated Jan. 13, 1970. Divided and this application Apr. 2, 1969, Ser. No. 812,855
Int. Cl. C08f 45/58
U.S. Cl. 260—45.7        5 Claims

ABSTRACT OF THE DISCLOSURE

Two phosphite stabilizers, tris-2-t-butyl-4-methyl-phenyl phosphite and bis(2-t-butyl-4-methyl - 6 - chlorophenyl)-phenyl phosphite are useful as process stabilizers in the production of poly alpha-olefins.

CROSS REFERENCE TO RELATED APPLICATION

This application is a division of Ser. No. 623,204, filed Mar. 15, 1967, now U.S. Pat. No. 3,489,826 entitled "Phosphite Antioxidants."

BACKGROUND OF THE INVENTION

In the production of polyolefins such as polypropylene, it is necessary to stabilize the polyolefin against changes in molecular structure due to thermal and oxidative conditions. Therefore, the polyolefin is stabilized in the initial processing which may include drying and extrusion of the polyolefin. The two new phosphite stabilizers of the present invention show extreme effectiveness as process stabilizers in polyolefins since the processing characteristics are relatively maintained while providing substantial oxidative stability to the polyolefin. Necessary requirements for a process stabilized among others are its relative cheapness, low volatility, good color characteristics when added to the polyolefin, and maintenance of processing characteristics such as melt flow rate (MFR) during processing.

SUMMARY OF THE INVENTION

The present invention is directed to two new stabilizers, tris-2-t-butyl-4-methylphenyl phosphite and bis(2-t-butyl-4-methyl-6-chlorophenyl)phenyl phosphite. More specifically the present invention is directed to the incorporation of these new phosphite stabilizers in polyolefins. Still more specifically, is the synergistic effect of incorporating the novel phosphite stabilizers with certain other components.

DESCRIPTION OF THE PREFERRED EMBODIMENTS

The phosphite stabilizers of the present invention may be produced by the condensation reaction of phosphorus trichloride and the corresponding phenols. Thus, tris-2-t-butyl-4-methylphenyl phosphite may be produced by the reaction of 3 moles of 2-t-butyl-4-methylphenol with 1 mole of phosphorus trichloride. The bis(2-t-butyl-4-methyl-6-chlorophenyl)phenyl phosphite may be made by first reacting 2 moles of 2-t-butyl-4-methyl-6-chlorophenol with 1 mole of phosphorus trichloride until reaction is complete and then reacting 1 mole of phenol with the reaction mixture. The HCl produced in the reaction may be removed by an HCl scavenger such as triethylamine.

The compositions of matter of the present invention when used as stabilizers for high molecular weight polyolefins are used in amounts from about 0.01 to about 1.0 weight percent of the polymer to be stabilized. Preferably the polymers are stabilized using from about 0.05 to about 0.20 percent by weight.

The polyolefin polymers stabilized or treated in accordance with the present invention are polymers which are produced by the well-known methods. The polymers may be illustrated by those produced by a high pressure process of a Ziegler-type polymerization process. The polyolefin polymers are exemplified by polymers of α-olefins having 2 to 8 carbon atoms in the molecule and may be illustrated by polyethylene, polypropylene, ethylene-propylene copolymers, ethylene-butene-1 copolymers, ethylene-pentene-1 copolymers, and the like, having molecular weights in the range from about 10,000 to about 1,000,000 or more. The polymers which are specifically illustrated for treatment in accordance with the present invention were produced by polymerization of the corresponding olefins employing the Ziegler-type polymerization catalyst.

The present invention may be further illustrated by the following examples which are set forth as illustration and not limitations on the present invention.

EXAMPLE 1

To a dry flask was added 98.4 g. (.6 mol) of 2-t-butyl-4-methylphenol, 60.6 g. (.6 mol) triethylamine and 500 g. benzene. To this stirred mixture was added, slowly 27.5 g. (.2 mol) of phosphorus trichloride in 150 ml. benzene. The contents were brought to reflux and held 2½ hours. The mixture was allowed to come to room temperature, filtered to remove the triethylammonium chloride and the filtrate percolated over a short column of neutral-activated alumina. The benzene was evaporated under vacuum to yield 82.8 g. (.16 mol) of tris-2-t-butyl-4-methylphenyl phosphite (80% of theory).

EXAMPLE 2

To a dry flask was added 39.7 g. (.2 mol) of 2-t-butyl-4-methyl-6-chlorophenol and 30.3 g. (.3 mol) of triethylamine in 125 ml. benzene. To this stirred solution was added 15.2 g. (.11 mol) phosphorus trichloride over a 10-minute period. The mixture was allowed to stir for 2¾ hours; then 9.4 g. (.1 mol) of phenol in 50 ml. of benzene was added over a 5-minute period. Stirring was continued for 1½ hours. The mixture was filtered and the filtrate passed through a short column of neutral-activated alumina. The benzene was evaporated under vacuum to yield 39.1 g. (.08 mol) of bis(2-t-butyl-4-methyl-6-chlorophenyl)phenyl phosphite (75% of theory).

EXAMPLE 3

Comparative data is set forth in Table I, below, comparing two known processing stabilizers, namely, Ionol (2,6-di-t-butyl-4-methylphenol) and Polygard (tris-p-nonylphenyl phosphite) with the phosphite stabilizers of the present invention. Each of the samples was tested for oxidative stability using the accelerated U-tube air test at 100° C. which is disclosed in ASTM-D-2445-65T.

TABLE I.—STABILIZING EFFECTIVENESS U-TUBE AIR

| Polymer | Stabilizer system | Weight percent | 100° C. days to failure |
|---|---|---|---|
| Polypropylene | None | | <6 |
| Do | Polygard | .1 | 18 |
| Do | Ionol | .1 | 9 |
| Do | LDW-2 [1] | .1 | 77 |
| Do | Polygard | .1 | 11 |
| Do | Polygard | .2 | 15 |
| Do | Ionol, Polygard | .1, .1 | 15 |
| Do | LDW-2,[1] Polygard | .1, .1 | 196 |
| Do | None | | 6 |
| Do | Polygard | .1 | 17 |
| Do | Ionol | .1 | 13 |
| Do | LDW-4 [2] | .1 | 230 |

[1] LDW-2—tris-2-t-butyl-4-methylphenyl phosphite.
[2] LDW-4—bis(2-t-butyl-4-methyl-6-chlorophenyl) phenyl phosphite.

From the data of Table I, the effectiveness of the two phosphite stabilizers of the present invention is clearly shown. Further, the stabilizers have good color properties and are compatible with the polypropylene. It is noted that the mixture of tris-2-t-butyl-4-methylphenyl phosphite (LDW-2) and Polygard exhibit a synergistic effect.

To illustrate the processability of the polypropylene containing the stabilizers of the present invention, the melt flow rate was measured after each of several extrusions. The comparative data set forth in Table II, below, comparing again Ionol and Polygard with LDW-2 (tris-2-t-butyl-4-methylphenyl phosphite) illustrates the improved stability of the polypropylene containing the stabilizers of the present invention. An increase in melt flow rate (MFR) indicates an increase in polymer breakdown and degradation.

TABLE II.—STABILIZING EFFECTIVENESS—EXTRUSION

| Stabilizer system | Weight percent | MFR, °F. | | | |
|---|---|---|---|---|---|
| | | 450 | 450 | 450 | 550 |
| Polygard | 0.2 | 1.6 | 1.8 | 2.4 | 5.8 |
| Ionol, Polygard | 0.1, 0.1 | 1.2 | 1.1 | 1.3 | 2.2 |
| LDW-2, Polygard | 0.1, 0.1 | 0.76 | 0.99 | 1.1 | 2.2 |
| Polygard | 0.1 | 8.6 | 10.8 | 9.6 | 19.9 |
| Ionol | 0.1 | 3.0 | 4.4 | 4.4 | 7.9 |
| LDW-2 | 0.1 | 4.0 | 5.0 | 4.6 | 8.7 |

From the data of Table II wherein the MFR was measured after each of three extrusions at 450° F. and the fourth at 550° F., the effectiveness of LDW-2 (tris-2-t-butyl-4-methylphenyl phosphite) to maintain the processing characteristics is shown to be comparable to Ionol but with vastly superior oxidative stability. On the other hand, LDW-2 is shown to be far superior to tris-p-nonylphenyl phosphite.

The importance of the present invention is emphasized by the necessity to produce polyolefins and specifically polypropylene with melt flow rates which can withstand storage and/or re-extrusion while maintaining its processing characteristics.

The nature and objects of the present invention having been completely described and illustrated, what I wish to claim as new and useful and secure by Letters Patent is:

1. A composition of matter comprising a polymer of an alpha-monoolefin containing 2 to 8 carbon atoms and a stabilizing amount of a compound selected from the group consisting of tris-2-t-butyl-4-methylphenyl phosphite and bis(2-t-butyl-4-methyl-6 - chlorophenyl)phenyl phosphite.

2. A composition according to claim 1 wherein said polymer is polypropylene.

3. A composition according to claim 1 wherein said polymer is polypropylene and said compound is tris-2-t-butyl-4-methylphenyl phosphite.

4. A composition according to claim 1 wherein said polymer is polypropylene and said compound is bis(2-t-butyl-4-methyl-6-chlorophenyl)phenyl phosphite.

5. A composition according to claim 3 containing a stabilizing amount of tris-p-nonylphenyl phosphite.

References Cited

UNITED STATES PATENTS

| | | | |
|---|---|---|---|
| 3,069,369 | 12/1962 | Galbraith et al. | 260—23 |
| 3,082,187 | 3/1963 | Fuchsman et al. | 260—45.95 |
| 3,115,465 | 12/1963 | Orloff et al. | 252—49.9 |
| 3,167,526 | 1/1965 | Nicholson | 260—45.75 |
| 3,305,520 | 2/1967 | Fritz et al. | 260—45.7 |
| 3,382,199 | 5/1968 | Scullin | 260—23 |

DONALD E. CZAJA, Primary Examiner

R. A. WHITE, Assistant Examiner

U.S. Cl. X.R.

260—45.95, 967